United States Patent
El Malki

Patent Number: 5,920,548
Date of Patent: Jul. 6, 1999

[54] ECHO PATH DELAY ESTIMATION

[75] Inventor: Karim El Malki, Rome, Italy

[73] Assignee: Telefonaktiebolaget L M Ericsson, Stockholm, Sweden

[21] Appl. No.: 08/725,655

[22] Filed: Oct. 1, 1996

[51] Int. Cl.$^6$ .............................. H04B 3/20; H04M 1/00
[52] U.S. Cl. .................... 370/291; 379/410; 379/411
[58] Field of Search .................... 370/290, 291, 370/286, 289; 379/410, 411; 364/724.19, 724.2

[56] References Cited

U.S. PATENT DOCUMENTS

| | | | |
|---|---|---|---|
| 4,061,878 | 12/1977 | Adoul et al. | 179/1 |
| 4,394,767 | 7/1983 | Shum | 375/13 |
| 4,645,883 | 2/1987 | Horna et al. | 379/406 |
| 4,686,703 | 8/1987 | Bruno et al. | 379/410 |
| 4,712,235 | 12/1987 | Jones, Jr. | 379/410 |
| 4,736,414 | 4/1988 | Montagna et al. | 379/411 |
| 4,894,820 | 1/1990 | Miyamoto et al. | 370/32.1 |
| 4,897,832 | 1/1990 | Suzuki et al. | 370/81 |
| 4,965,822 | 10/1990 | Williams | 379/390 |
| 5,058,111 | 10/1991 | Kihara et al. | 370/94 |
| 5,315,585 | 5/1994 | Iizuka et al. | 370/32.1 |

FOREIGN PATENT DOCUMENTS

| | | |
|---|---|---|
| 0 137 508 A1 | 4/1985 | European Pat. Off. . |
| 0 656 695 A1 | 6/1995 | European Pat. Off. . |

OTHER PUBLICATIONS

Sondhi and Berkley; "Silencing Echoes on the Telephone Network", Proceedings of the IEEE, vol. 68, No. 8, pp. 948–963, 1990 No month.

Messerschmitt, "Echo Cancellation in Speech and Data Transmission", IEEE Journal on Selected Areas in Communications, vol. 2, No. 2, pp.. 283–297, 1984 no month.

Duttweiler and Chen, "A Single–Chip VLSI Echo Canceler", The Bell system Technical Journal, vol. 59, No. 2, pp. 149–160, 1980 no month.

Fertner, U.S. Patent Application Ser. No. 08/679,387, "Frequency Domain Signal Reconstruction in Sampled Digital", filed Jul. 8, 1996.

*Primary Examiner*—Michael Horabik
*Assistant Examiner*—Kevin C. Harper

[57] ABSTRACT

An echo cancellation apparatus (20) and method involves an operation AEPR for analyzing echo path response and thereafter an operation CR for configuring an adaptive FIR filter (52). The configuration of the adaptive filter (52) advantageously results in only a range of filter taps and coefficients between two specified tap endpoints being involved in filter multiplication, addition, and storage during the echo cancellation operation.

23 Claims, 6 Drawing Sheets

ECHO PATH DELAY ESTIMATION

BACKGROUND

This application is related to U.S. patent application Ser. No. 08/725,656 filed simultaneously by Karim El Malki, entitled "SILENCE-IMPROVED ECHO CANCELLER" and incorporated herein by reference.

1. Field of Invention

This invention pertains to speech and acoustic signal processing, and particularly to a determination of echo path delay and operation of echo cancellers.

2. Related Art and Other Considerations

Echo cancellers are widely used both in terrestrial and atmospheric (i.e. radio, microwave) communication to eliminate the "echo" phenomenon which greatly affects the quality of speech and audio services. An echo canceller essentially uses a copy of the data incoming to a listener to digitally estimate the echo that should return on the outgoing line. Having calculated the estimate, the echo canceller subtracts the echo estimate from the outgoing signal such that the echo cancels out.

An example of the problem of echo occurs in telephonic transmissions. In most cases, a phone conversation is transmitted between terminating equipment (TE) and a hybrid transformer circuit over a pair of unidirectional 2-wire lines (i.e., over four wires), and then from the hybrid circuit over a bidirectional 2-wire line. Thus, the junction between the two types of lines is implemented by the hybrid transformer. Since hybrid transformers are balanced for an average line impedance, they do not perfectly separate the two unidirectional paths from each other, and therefore they create echo signals. Moreover, if a delay is introduced in the four wire path (as can occur for satellite transmission or for digital encoding), the echos must be canceled to ensure better speech quality.

Simply speaking, echo cancellers typically employ an adaptive finite impulse response (FIR) digital filter; a cancelation processor for controlling the FIR; a subtractor; a near-end speech detector; and, a non-linear processor. The FIR receives the copy of the data (as it is successively sampled) which is transmitted from the far end on an incoming communications path to the near end. The FIR generates an estimate of the echo which would, unless canceled, be reflected back from the near end to the far end on an outgoing communications path. At the appropriate time, the FIR's estimate of the echo is subtracted by the subtractor from the signal on the outgoing communications path in an attempt to cancel out the echo. In generating its estimate of the echo, the FIR is controlled by the cancelation processor. In controlling the FIR the cancellation processor takes into consideration the signal output from the subtractor as well as any indication from the near-end speech detector that double-talk is occurring (e.g., that both parties at the far and near end are talking). The non-linear processor attempts to suppress any remaining amount of echo which the FIR is unable to cancel.

The FIR is a transversal filter with a number of taps and a corresponding number of coefficients. A tap is a unit of delay time equal to the sampling time or sampling rate. The coefficients are values (stored in registers) which are multiplied by the input signal in order to obtain the echo estimate. The cancellation processor executes an algorithm for adapting (e.g., modifying or updating) the filter coefficients, so that the filter coefficients converge to optimum (or near optimum) values faster than the echo response characteristics change and thereby enable cancellation of the echo. See, for example, U.S. patent application Ser. No. 5,793,801 of Antoni Fertner, entitled "FREQUENCY DOMAIN SIGNAL RECONSTRUCTION IN SAMPLED DIGITAL COMMUNICATIONS SYSTEMS, which is commonly assigned herewith and incorporated herein by reference.

In most echo cancelers such adaptation does not occur while the near-end speech detector detects the double-talk condition. The length of the FIR (number of taps) and the rate at which the coefficients must be updated depends on the type of service, the path (e.g., line) characteristics, and the distance of the echo source from the canceller.

Operation of a prior art echo canceller typically involves an estimation of the entire echo path response. The typical echo path response is formed by a "pure delay" element and a "tail delay". The pure delay is the actual propagation time taken by the signal from its source (e.g., the echo canceller) to a hybrid and backwards. The "tail delay", on the other hand, is the response of the hybrid circuit which terminates the four-wire line and performs impedance matching.

Not all of the echo path response is relevant to the calculations of an echo canceller. The pure delay element and any portion coming after the tail delay is not relevant and accordingly need not be involved in the adaptive calculations of the echo canceller.

Since an echo canceller's complexity is related to the number of filter taps it uses, the reduction of the number of these filter taps is important for optimization of filter operation. In order to minimize the echo canceller's calculations, an estimate of the echo path delay needs to be calculated such that the actual number of required taps may be determined. Therefore, a method of determining the duration of these portions of the echo path response is necessary to optimize an echo canceller.

U.S. Pat. No. 4,736,414 to Montagna performs a search on the coefficients of the adaptive filter to find the maximum absolute value, corresponding to the peak of the echo path response. According to the Montagna technique (illustrated in FIG. 8), assuming that the maximum value is found at coefficient or filter tap $W_{MAX}$, a value W is calculated by subtracting a fixed integer from $W_{MAX}$. Assuming that the hybrid response lasts N samples (or taps) and given the hybrid response start as W, then the end of the relevant portion of the impulse response is $W_{MAX}+N-1$. This provides the boundaries for the segment T2, which is the only portion of the echo path required for echo cancellation. Once this is established, the adaptive filter echo canceller operates on interval T2, and will only use interval T1 as pure delay.

However, a problem with the technique described above is its assumption that $W_{MAX}$ lies a fixed integer amount of samples from the start of the hybrid response, as is illustrated in FIG. 9. When this assumption is not applicable to a certain system, there is an erroneous echo path calculation, causing the filter to diverge and disrupt the communication. Therefore it is necessary in implementing this technique that there be a calibration to the type of line characteristics of each application.

Other attempts have been made to operate an echo canceller with less than a total number of available filter taps. U.S. Pat. No. 4,751,730 to Galand et al. determines a range of coefficients needed to operate a cancellation filter by measuring energies of incoming and outgoing signals, and then comparing the ratio of the energies to a predetermined threshold to generate flag information which is used to control a switch on the echo path. U.S. Pat. No. 5,473,686 to Virdee continually modifies the length (or number of taps) of a adaptive FIR filter by selecting a trial number of samples, operating the filter for a sufficient length of time to allow the tap weights in the filter to stabilize, examining tap weights to determine whether the taps at the end of the filter contribute to the echo estimate, and (if necessary) increasing or decreasing the number of filter-utilized taps.

What is needed is method and apparatus for accurately determining echo path delay, as well as for accurately determining an appropriate number of taps to utilize for a FIR filter of an echo canceller.

SUMMARY

An echo cancellation apparatus and method involves an operation AEPR for analyzing echo path response and thereafter an operation CR for configuring an adaptive FIR filter. The configuration of the adaptive filter advantageously results in only a range of filter taps and coefficients between two specified tap endpoints being involved in filter multiplication, addition, and storage during the echo cancellation operation.

The operation for analyzing echo path response determines echo path length of a communication system having an incoming communication path and an outgoing communication path. Subsequent to convergence of the filter, the method comprises transmitting a signal on the incoming communication path, and then with respect to the signal, determining which of a first predetermined number of taps of the filter has a predetermined value. Next, a first tap of the filter is located which has a value which is a predetermined factor greater than the predetermined value. Next, a tap of the filter which has tap order which is a second predetermined number of taps less than the located tap is selected as a boundary tap. The using a position of the boundary tap is then used to determine the echo path length.

The operation CR for configuring an adaptive FIR filter determines which of a first predetermined number of taps of the filter has a predetermined value. Next, a first tap of the filter is located which has a value which is a predetermined factor greater than the predetermined value. Next, a tap of the filter which has tap order which is a second predetermined number of taps less than the located tap is selected as a configuration boundary first tap. A configuration boundary second tap of the filter is selected as having a tap order which is a third predetermined number of taps greater than the configuration boundary first tap. The configuration boundary first tap and the configuration boundary second tap are used to determine what taps are to be excluded from filter multiplication during the echo canceling operation. All taps less than the configuration boundary first tap serve as a buffer through which sample values of the signal are shifted during the echo canceling operation.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
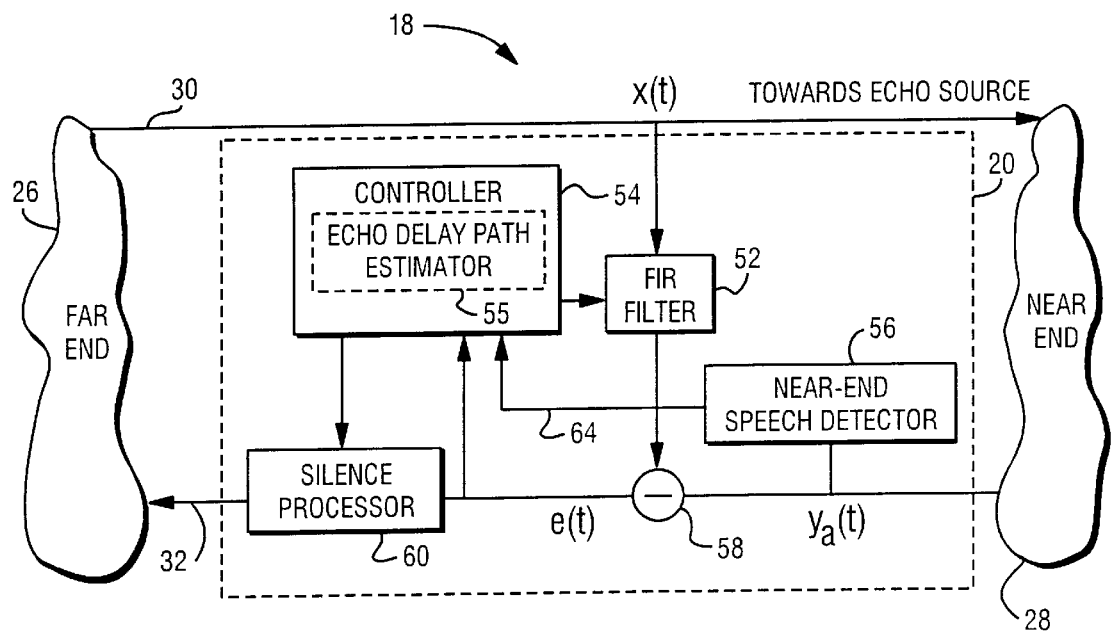
FIG. 1 is a schematic view of an echo canceller according to an embodiment of the invention.

FIG. 1 shows a communications system 18 which utilizes an echo canceller 20 according to an embodiment of the invention. Communications system 18 is illustrated as having a far end 26 and a near end 28. An incoming communications path 30 carries signals from far end 26 to near end 28; an outgoing communications path 32 carries signals from near end 28 to far end 26. Paths 30 and 32 may be terrestrial lines (e.g., wires) or microwave channels or may involve satellite linkages.

Figure 2:
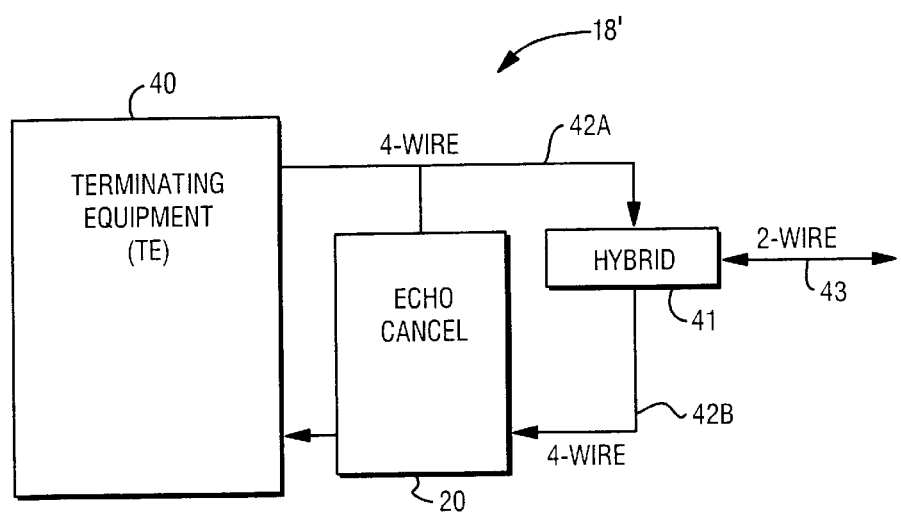
FIG. 2 is a schematic view of an example communications system which utilizes the echo canceller of FIG. 1.

FIG. 2 shows one example of a communications system 18' which utilizes echo canceller 20. The example of FIG. 2 is a telephonic communications system 18' wherein a phone conversation is transmitted between terminating equipment (TE) 40 and a hybrid transformer circuit 41 over a pair of unidirectional 2-wire lines 42A, 42B (i.e., over four wires), and then from the hybrid circuit 41 over a bidirectional 2-wire line 43. It should be understood that use of echo canceller 20 is not limited to this example, but that echo canceller 20 is also employed in other applications including digital, microwave, and satellite applications.

Echo canceller 20 of FIG. 1 includes an adaptive FIR filter 52; a cancellation controller 54; a near-end speech detector 56; a subtractor 58; and, a non-linear processor 60. Adaptive FIR filter 52 is connected to receive a signal $x(t)$ on incoming communications path 30. FIR filter 52 is connected to operate under supervision of controller 54. An echo estimate generated by FIR filter 52 is applied to subtractor 58, which subtracts the echo estimate from the outgoing signal $y_a(t)$ on path 32 to yield a signal $e(t)$. Near-end speech detector 56 is connected to outgoing communications path 32 for monitoring speech occurring at near end 28, and for generating a near-end speech detection signal for application on line 64 to controller 54. The signal $e(t)$ is applied both to controller 54 and non-linear processor 60. Controller 54 is connected to supervise operation of non-linear processor 60.

Controller 54 includes an echo path delay estimator 55. The functions of estimator 55 are described in more detail hereinafter.

Figure 3:
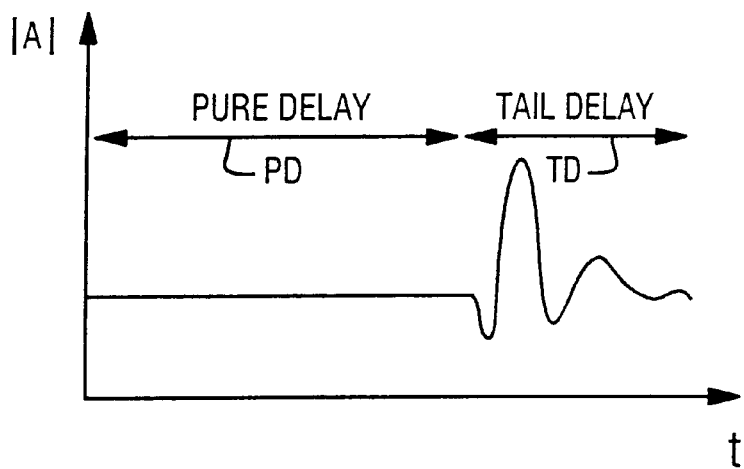
FIG. 3 is a graphical view of a typical echo path impulse response.

The impulse response of a four-wire line terminated by a hybrid circuit such as that illustrated in FIG. 2 has the form shown in FIG. 3, representing a sync-like function. The typical echo path response is formed by a pure delay component PD and a tail delay component TD. The pure delay component PD is the actual propagation time taken by the signal from its source(e.g., echo canceller 20 in FIG. 2) on the four-wire line to the hybrid (e.g., hybrid 41) and backwards. The tail delay component TD is the response of the hybrid circuit itself, which terminates the four-wire line and performs impedance matching. The pure delay component PD and any portion coming after the tail delay TD is not relevant and should not be involved in the adaptive calculations of echo canceller 20. Therefore, echo canceller 20 of the present invention provides a method of determining the duration of these components or portions of the echo path response, and thereby optimizes its operation.

Figure 4:
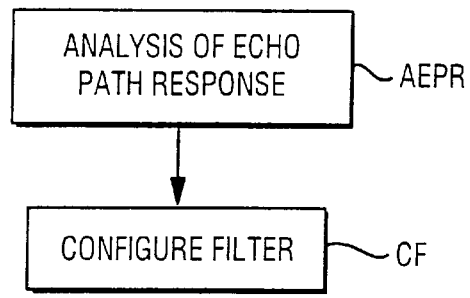
FIG. 4 is a flowchart illustrating general steps performed by a controller of the echo canceller of FIG. 1.
Figure 8:
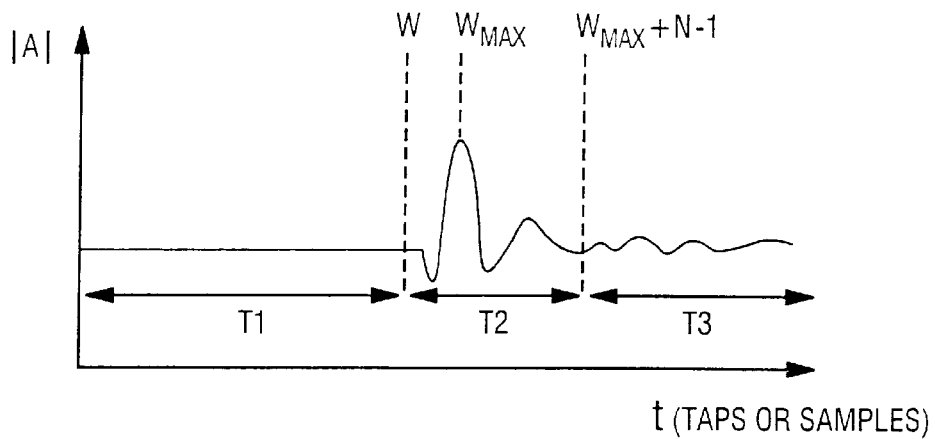
FIG. 8 is a graphical view depicting echo path delay and other calculations in accordance with a prior art method.
Figure 9:
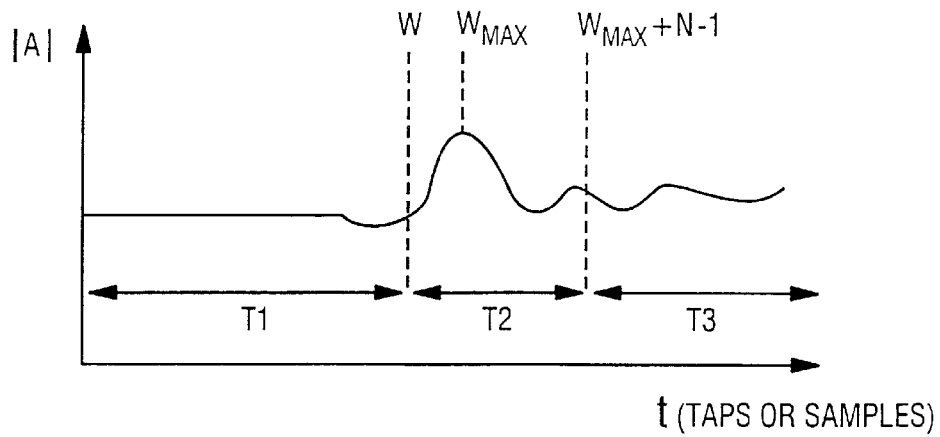
FIG. 9 is a graphical view depicting inaccuracies of echo path delay and other calculations in accordance with a prior art method.

FIG. 4 is a flowchart showing two operations conducted by echo controller 52. The first operation (operation AEPR in FIG. 4) is analysis of the echo path response. Echo path response operation AEPR is particularly performed by estimator 55 of echo controller 52. The second operation is configuration of adaptive FIR filter 54 (operation CF in FIG. 4) so that only a range of filter taps between two specified tap endpoints are utilized during the echo cancellation operation.

Figure 4A:
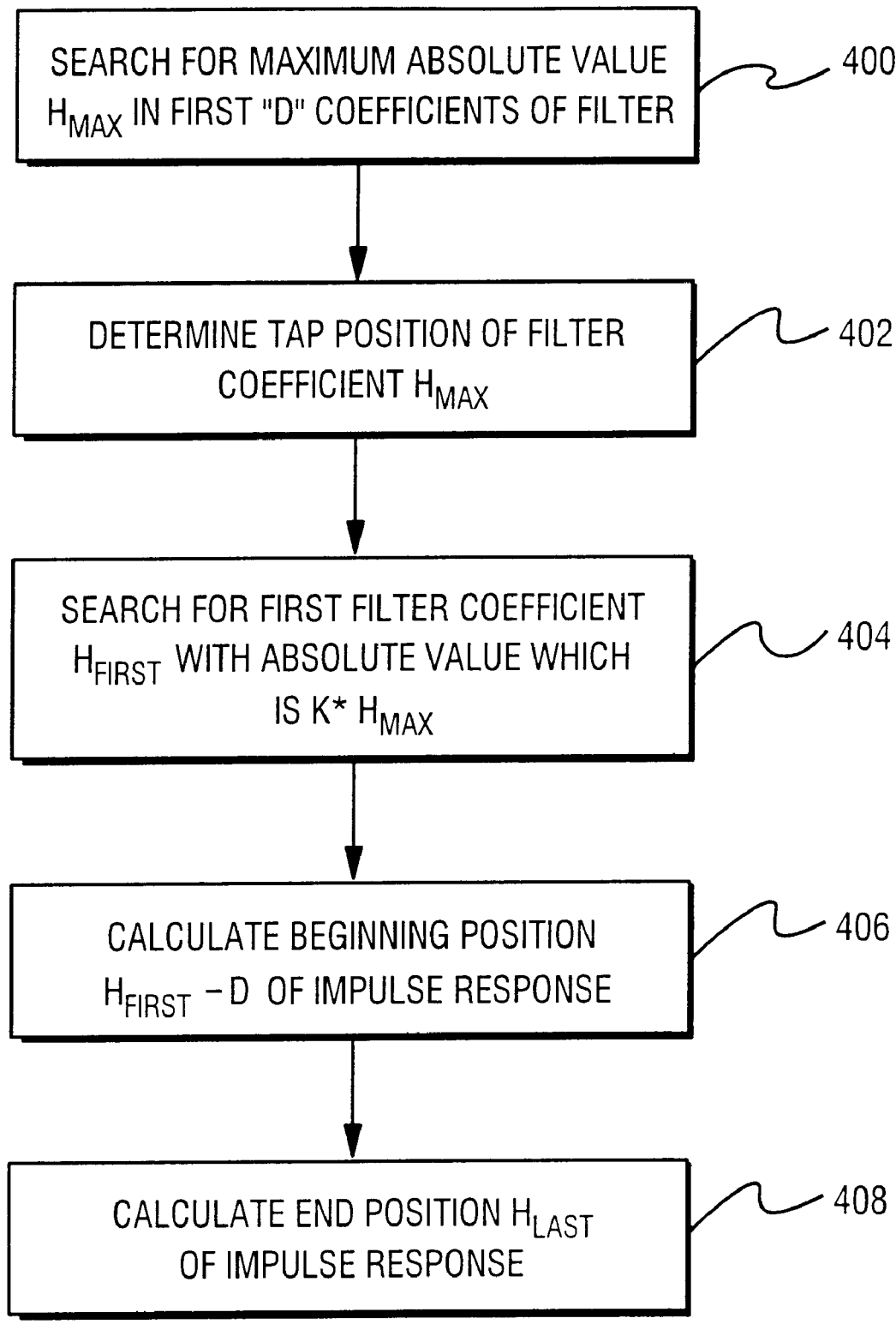
FIG. 4A is a flowchart illustrating general steps performed by an echo path delay estimator of the echo canceller of FIG. 1.

FIG. 4A is flowchart illustrating steps performed by estimator 55 of echo controller 52 following the convergence of echo canceller 20. A first step 400 in the method is an initial search for the maximum absolute value MAX contained in the first D coefficients of the filter. Preferably the value of D is small, and in the illustrated example is chosen to be 10. The tap position of this maximum value is ascertained (at step 402) and is referred to as the $H_{MAX}$ value. Step 404 involves a search for the first ensuing filter coefficient with an absolute value which is K times greater than MAX. The value for K, also known as a predetermined factor, should be set to at least 4 but not greater than 20, in order to avoid locating noisy spikes. The tap position for the filter coefficient obtained at step 404 is referenced as $H_{FIRST}$. At step 406, a beginning of the impulse response is calculated as $H_{FIRST}-D$, which tap is also known as the configuration boundary first tap. At step 408, a value HYBRID corresponding to the maximum tail delay duration is added to $H_{FIRST}-D$ to produce $H_{LAST}$, which marks the end of the impulse response and which is also known as the configuration boundary second tap. Preferably the maximum tail delay HYBRID is set to 8N−1 taps (N being an integer).

Figure 5:
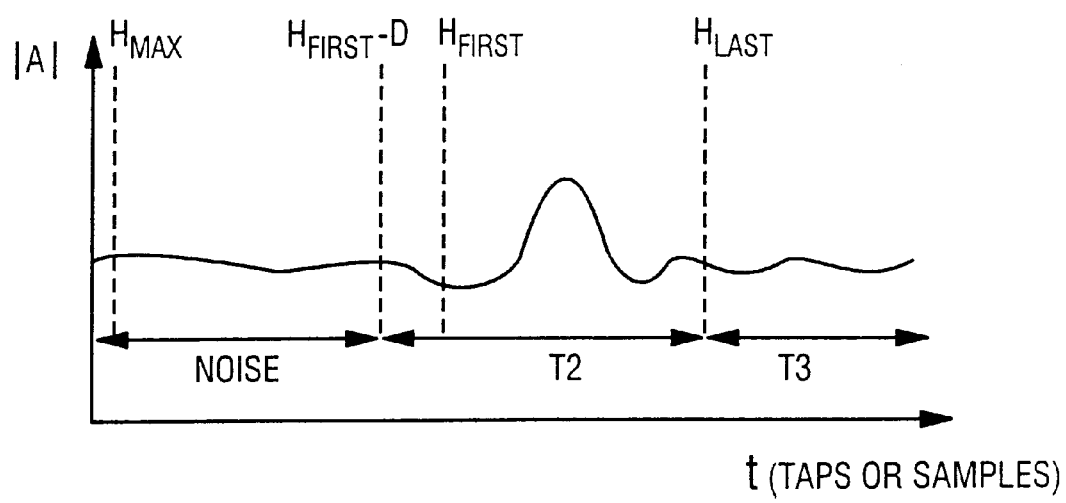
FIG. 5 is a graphical view depicting echo path delay and other calculations in accordance with a method of the invention.

The present method ensures a correct estimation of the amount of pure delay and of the location of segment T2 of the impulse response in FIG. 5. It is during the time of segment T2 that coefficients of the FIR filter 52 are potentially updated for sake of echo cancellation.

Figure 4B:
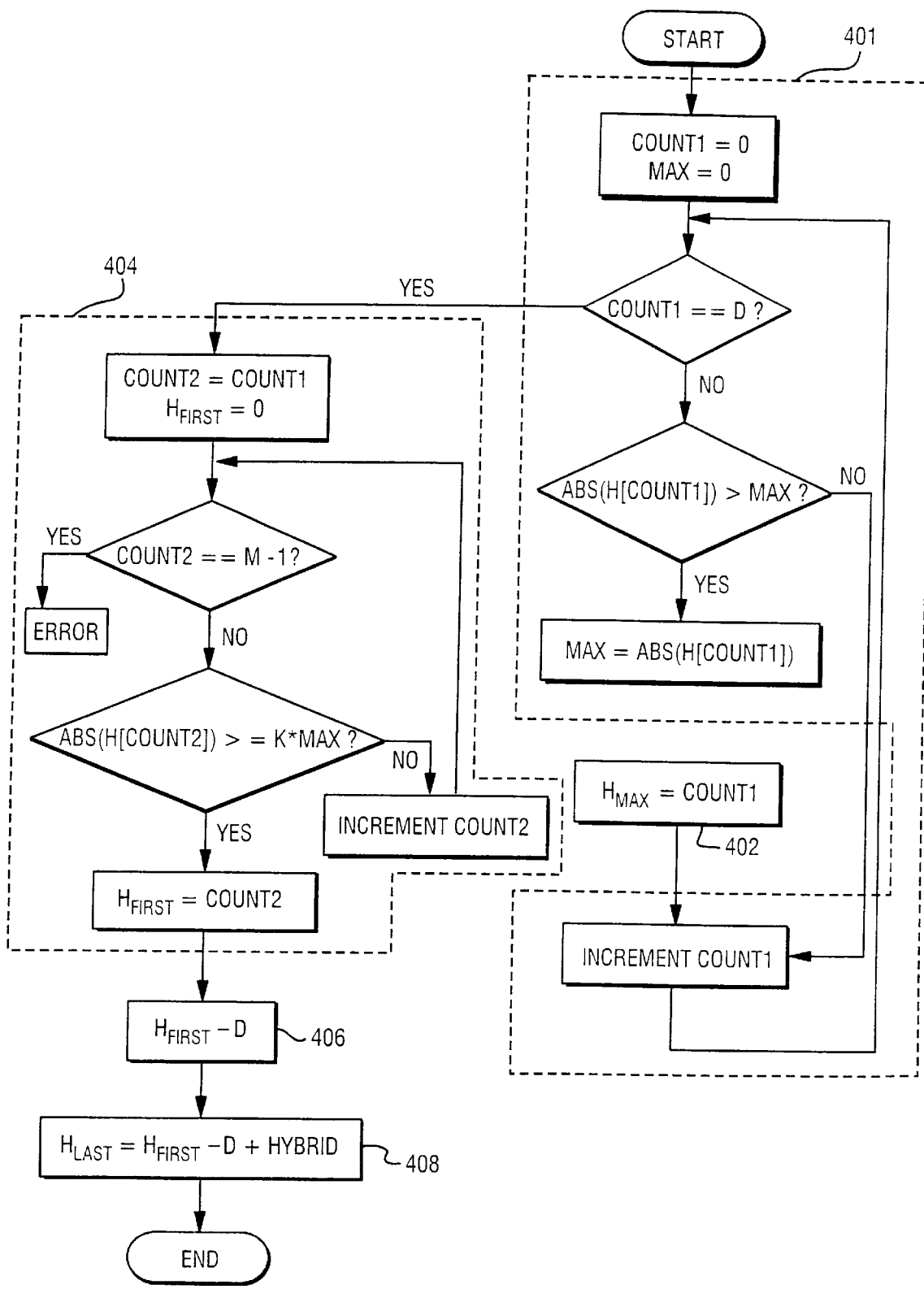
FIG. 4B is a flowchart illustrating more detailed steps performed by the echo path delay estimator of the echo canceller of FIG. 1.

FIG. 4B shows in more detail the steps illustrated in FIG. 4A. The following assumptions are made in connection with the steps of FIG. 4B: Adaptive FIR filter 52 has converged. A vector H containing the M number of filter coefficients exists (H[0] to H[M−1]). The impulse response contained in vector H starts at H[0] and ends at H[M−1]. D has been set to a small value (i.e. 10). K has been set to an appropriate number (i.e. 4). HYBRID has been set to (Maximum Tail Delay−1)=47 taps (e.g., 8N−1=47 when N=6) or about 6 ms.

An ERROR condition has been included in the flowchart of FIG. 4B. The ERROR condition would occur if the line characteristics are relatively flat, and would in any case cause the algorithm to malfunction. In this case a negligible amount of echo reflection would be present and the echo canceller 20 should not have been activated in the first instance.

FIG. 4B further assumes the existence of the following variables for intermediate results and loop counting:

count1—Counter for first loop count2—Counter for second loop

Max—Maximum absolute value contained in the first D coefficients in vector H $H_{MAX}$—Position in vector H of Max value.

The abs ( ) function identifies the absolute value of a variable.

Figure 6:
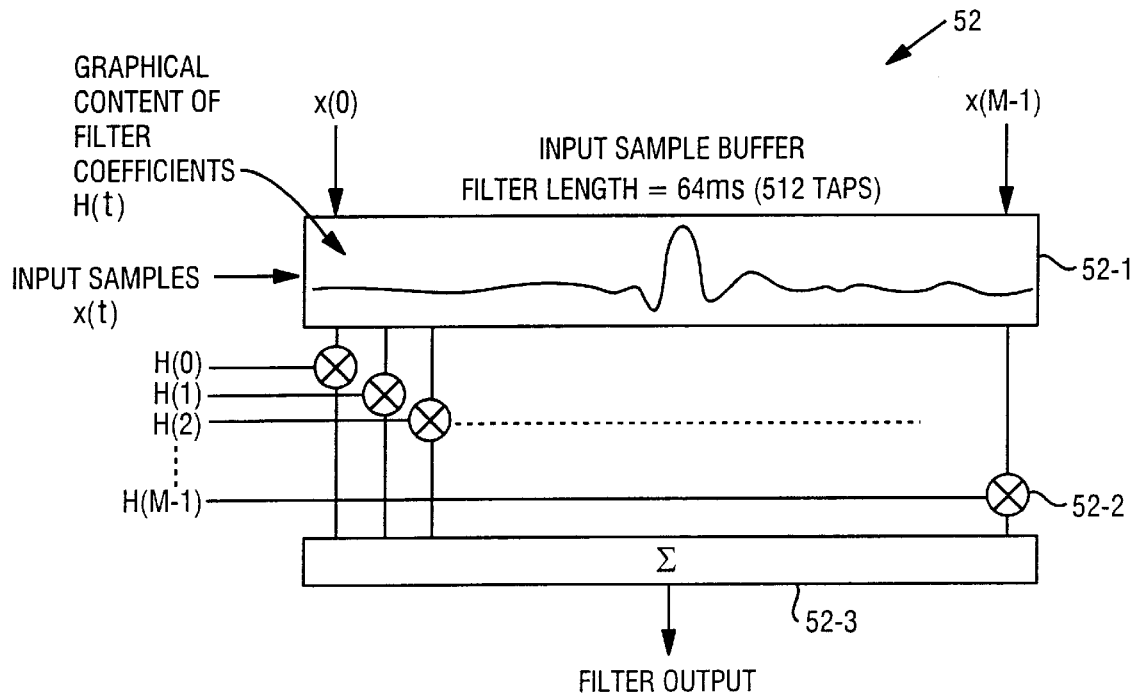
FIG. 6 is a schematic illustration of the use of a 512-tap digital filter in an operation of the present invention of analyzing the echo path response.

During the operation of analyzing the echo path response (the AEPR operation shown in FIG. 4A and in more detail in FIG. 4B), FIR digital filter 52 is operated as shown in FIG. 6. As shown in FIG. 6, FIR digital filter 52 has a buffer 52-1 of 512 taps, a plurality (M number) of multipliers 52-2; and a summer 52-3. Filter buffer 52-1 is a first-in, first-out buffer which receives input samples from signal x(t) on incoming communications path 30. The samples are shifted through the 512 taps of buffer 52-2 and constitute a vector X having elements X(0) through X(M−1), where M=512 for the AEPR operation. Within the rectangular box 52-1 of FIG. 6 is illustrated a graphical depiction of the content of the filter coefficients H(t). A first of the multipliers 52-2 multiplies X(0) by H(0), a second of the multipliers 52-2 multiplies X(1) by H(1), and so forth, a total of M=512 multipliers being utilized for the AEPR operation. The products of all multipliers 52-2 are summed in summer 52-3, from which a filter output signal results.

Once the echo path delay estimation algorithm has been completed, and the AEPR operation as described above has resulted in a determination of which taps of digital filter 52 need be utilized for multiplication of coefficients, adaptive FIR filter 52 is configured and operated in an optimized fashion as represented by operation CF in FIG. 4 and as hereinafter described with reference to FIG. 7.

Figure 7:
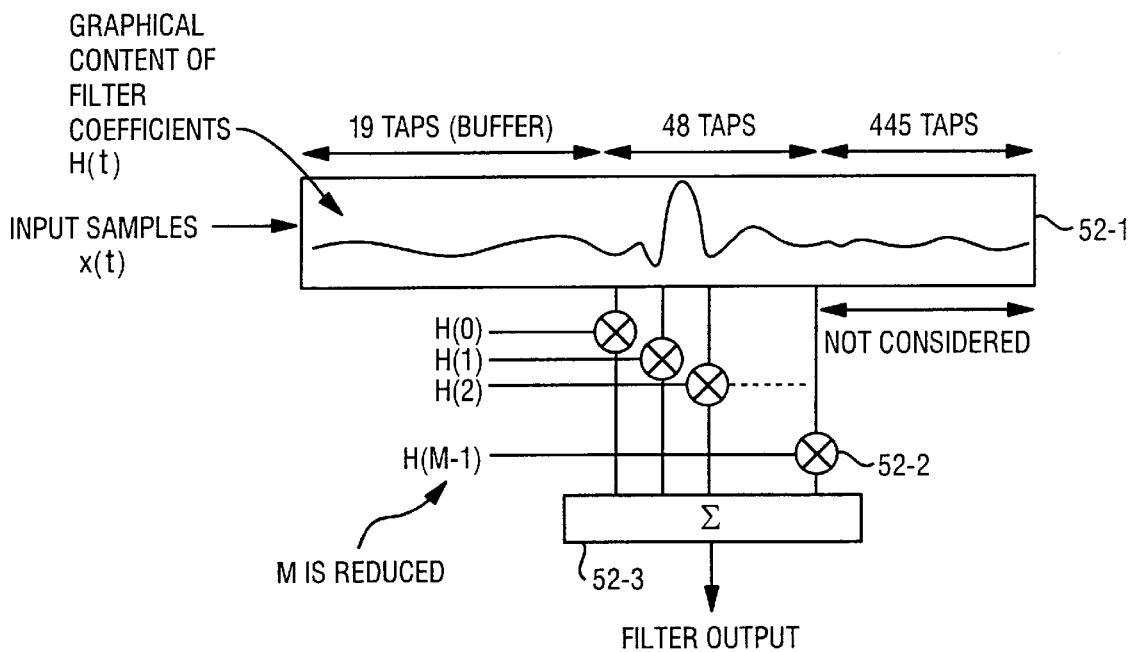
FIG. 7 is a schematic illustration of utilization of a digital filter after optimized configuration of the filter in accordance with an illustrative case of the present invention.

FIG. 7 is an illustration of optimization of a 512-tap digital filter operation in accordance with an illustrative case of the present invention. In the example case of FIG. 7, it is assumed that the method of the present invention results in the echo path calculations with the following values: $H_{FIRST}=30$; $H_{FIRST}-D=20$; $H_{LAST}=20 +(48-1)=67$. Accordingly, in the case of FIG. 7, taps 1 to 19 and 68 to 512 are excluded from calculations of adaptive FIR filter 52. That is, multipliers 52-2 are enabled only the 48 taps (taps 20 to 67 inclusive) for which updating is necessary. The first 19 taps of FIR filter 52 form a buffer through which the input samples x(t) are serially shifted, those samples ultimately reaching the multiplication-active taps 20–67.

The segments below tap 20 and above tap 67 only contain noise and interference and bring inaccuracies to the echo cancellation procedure by storing and propagating noise in the calculations. In the example of FIG. 7, the first 19 taps of filter 52 act as a buffer which implements the flat pure delay characteristics, while the final 445 taps are not considered at all. Thus, after the optimization of FIG. 7, M=48 rather than 512, thereby providing a significant reduction of the number of operations (e.g., multiplication and summation operations).

Thus, after the echo path delay estimation algorithm and the AEPR operation has been completed, digital filter 52 of echo canceller 20 can be configured automatically and optimally, and then left to function in accordance with its optimized configuration. That is, once controller 54 has established the range of taps and end taps necessary in order to function optimally, controller 54 configures FIR filter 52 by paring down the number of taps utilized for multiplication to only those taps which are required. Should conditions ever change and the system require reoptimization, the processes described herein can be repeated.

It should be understood that, in one particular hardware implementation of the echo canceller 20 of the invention, the functions of the adaptive FIR filter, the controller, the near-end speech detector, the subtractor, and the silence processor are all performed by a signal processor (which may include one or more processors). Alternatively, the functions of these elements may be carried out using one or more integrated circuits (e.g., ASICs). Such circuits may be designed to perform the required digital filtering and algorithm control applications using logic or may be embedded DSP device(s).

It should be understood that echo canceller 20 of the present invention can be operated in conjunction with the silence-detection techniques disclosed in U.S. patent application Ser. No. 08/725/656 filed simultaneously by Karim El Malki, entitled "SILENCE-IMPROVED ECHO CANCELLER", and incorporated herein by reference.

Therefore, the method of the present invention provides both for a more efficient use of the resources of computation, and an improvement in the echo canceller's performance. In the above example a considerable saving in memory is also made since the final 445 coefficients and 445 filter taps are eliminated. Generally this method brings about a very large reduction in the computational complexity of the whole echo canceller and a noticeable improvement in echo canceller performance in general.

The method of the present invention provides for calculations which renders echo cancellation more efficient. However, the present method does not disrupt normal real-time echo cancellation itself. If the implementation chosen is software/firmware (DSP), then it is possible that the processing limits of the device do not allow real-time processing of both the ordinary echo cancellation operation and at the same time the echo path delay estimation calculations. Therefore, after convergence the filter coefficients (vector H) may be stored, and the algorithm may be processed on these coefficients part by part or whenever processing time is available. This may take a number of complete echo cancellation cycles (i.e. for a number of input samples to be processed).

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A method of determining what taps of an adaptive filter are to be excluded from utilization during an echo canceling operation, the method comprising:
   (1) subsequent to convergence of the filter, receiving a signal on the incoming communication path and applying the signal to the filter and to a device from which the signal is at least partially reflected back on an outgoing communications path, and then with respect to the signal
   (2) determining which of a first predetermined number of taps of the filter has a greatest absolute non-zero signal value;
   (3) determining a first tap of the filter which has a signal value which is at least a predetermined factor greater than the greatest absolute non-zero signal value determined in step (2);
   (4) selecting, as a configuration boundary first tap, a tap of the filter which has tap order which is a second predetermined number of taps less than the tap determined in step (3);
   (5) selecting, as a configuration boundary second tap, a tap of the filter which has tap order which is a third predetermined number of taps greater than the tap determined in step (3);
   (6) using the configuration boundary first tap and the configuration boundary second tap to determine what taps are to be excluded from filter multiplication during the echo canceling operation.

2. The method of claim 1, wherein the first predetermined number of taps of the filter of step (2) are consecutive taps at a beginning of the filter.

3. The method of claim 1 wherein the first predetermined number of taps is ten.

4. The method of claim 1, wherein the predetermined factor is not less than four and not greater than 20.

5. The method of claim 1, wherein the second predetermined number is equal to the first predetermined number.

6. The method of claim 5, wherein the second predetermined number and the first predetermined number are ten.

7. The method of claim 1, wherein the third predetermined number is substantially equal to 8N-1 where N is an integer.

8. The method of claim 1, wherein all taps less than the configuration boundary first tap are excluded from filter multiplication during the echo canceling operation.

9. The method of claim 8, wherein all taps less than the configuration boundary first tap serve as a buffer through which sample values of the signal are shifted during the echo canceling operation.

10. The method of claim 1, wherein all taps greater than the configuration boundary second tap are excluded from utilization during the echo canceling operation.

11. A method of determining an echo path length of a communication system having an incoming communication path and an outgoing communication path, the communication system having an adaptive FIR filter, the method comprising:
   (1) subsequent to convergence of the filter, transmitting a signal on the incoming communication path and applying the signal to the filter and to a device from which the signal is at least partially reflected back on the outgoing communications path, and then with respect to the signal
   (2) determining which of a first predetermined number of taps of the filter has a greatest absolute non-zero signal value;
   (3) determining a first tap of the filter which has a signal value which is at least a predetermined factor greater than the greatest absolute non-zero signal value determined in step (2);
   (4) selecting, as a boundary tap, a tap of the filter which has tap order which is a second predetermined number of taps less than the tap determined in step (3);
   (5) using a position of the boundary tap to determine the echo path length.

12. The method of claim 11, wherein the first predetermined number of taps of the filter of step (2) are consecutive taps at a beginning of the filter.

13. The method of claim 11, wherein the first predetermined number of taps is ten.

14. The method of claim 11, wherein the predetermined factor is not less than four and not greater than 20.

15. The method of claim 11, wherein the second predetermined number is equal to the first predetermined number.

16. The method of claim 15, wherein the second predetermined number and the first predetermined number are ten.

17. An echo canceller comprising:

an adaptive filter which receives an incoming signal on a communications path and which has a plurality of taps;

a controller which, when the filter receives the incoming signal, performs the following operations:

(1) determines which of a first predetermined number of taps of the filter has a greatest absolute non-zero signal value;

(2) determines a first tap of the filter which has a signal value which is at least a predetermined factor greater than the greatest absolute non-zero signal value determined at (1);

(3) selects, as a configuration boundary first tap, a tap of the filter which has tap order which is a second predetermined number of taps less than the tap determined in (2);

(4) selects, as a configuration boundary second tap, a tap of the filter which has tap order which is a third predetermined number of taps greater than the tap determined in (2); and (5) uses the configuration boundary first tap and the configuration boundary second tap to determine what taps are to be excluded from filter multiplication during the echo canceling operation.

18. The apparatus of claim 17, wherein the first predetermined number of taps of the filter of step (2) are consecutive taps at a beginning of the filter.

19. The apparatus of claim 18, wherein the first predetermined number of taps is ten.

20. The apparatus of claim 17, wherein the predetermined factor is not less than four and not greater than 20.

21. The apparatus of claim 17, wherein the second predetermined number is equal to the first predetermined number.

22. The apparatus of claim 21, wherein the second predetermined number and the first predetermined number are ten.

23. The apparatus of claim 17, wherein the third predetermined number is substantially equal to forty eight.

* * * * *